US011046162B1

(12) United States Patent
Priebe (10) Patent No.: US 11,046,162 B1
(45) Date of Patent: Jun. 29, 2021

(54) AUTOMOBILE WIND DIRECTING ACCESSORY DEVICE

(71) Applicant: Walter Priebe, Fort Lauderdale, FL (US)

(72) Inventor: Walter Priebe, Fort Lauderdale, FL (US)

(*) Notice: Subject to any disclaimer, the term of this patent is extended or adjusted under 35 U.S.C. 154(b) by 0 days.

(21) Appl. No.: 16/355,821

(22) Filed: Mar. 17, 2019

Related U.S. Application Data

(63) Continuation-in-part of application No. 15/438,664, filed on Feb. 21, 2017, now Pat. No. 10,232,692.

(60) Provisional application No. 62/297,821, filed on Feb. 20, 2016.

(51) Int. Cl.
*B60J 7/22* (2006.01)
*B60J 1/20* (2006.01)
*B60R 11/00* (2006.01)

(52) U.S. Cl.
CPC . *B60J 7/22* (2013.01); *B60J 1/20* (2013.01); *B60J 7/223* (2013.01); *B60R 11/00* (2013.01); *B60R 2011/008* (2013.01); *B60R 2011/0059* (2013.01)

(58) Field of Classification Search
CPC ... B60J 7/22; B60J 7/223; B60J 1/2002; B60J 1/20; B60H 1/265; B60H 1/30
USPC .......... 296/217, 85, 78.1, 152, 180.1, 180.5; 40/591–593
See application file for complete search history.

(56) References Cited

U.S. PATENT DOCUMENTS

| | | | | | |
|---|---|---|---|---|---|
| 5,033,528 | A | * | 7/1991 | Volcani | A45B 17/00 160/351 |
| 5,769,526 | A | * | 6/1998 | Shaffer | B60Q 1/24 362/396 |
| 6,076,879 | A | * | 6/2000 | Bills | B60R 13/01 296/39.1 |
| 9,117,381 | B1 | * | 8/2015 | Shaw, IV | G09F 7/18 |

* cited by examiner

*Primary Examiner* — Dennis H Pedder
(74) *Attorney, Agent, or Firm* — David P. Lhota, Esq.; Lhota & Associates, P.A.

(57) ABSTRACT

An automobile wind directing accessory device that is attachable to a sunroof or door window opening of an automobile and has a panel or windshield, support track secured to a rear surface of the windshield, a support bracket assembly rotatably connected to the windshield and at least one adjustable clamp having a first leg slidably connected to the support arm to enable the clamp to be adjusted inward or outward inside the sunroof opening to dictate the point where the windshield directs wind flow into the cabin of a vehicle and a second leg pivotally connected to the first leg by a spring device that maintains tips of the first leg and second leg in engagement with a vehicle in a normally closed position to secure the wind directing device in a vehicle opening and that are separated and opened when the first leg and second leg of the clamp are squeezed toward each other. The automobile wind directing accessory device is adapted for attached to a vehicle inside a window wherein the clamped is affixed to the support bracket in alignment with the rear surface of the wind shield.

6 Claims, 11 Drawing Sheets

AUTOMOBILE WIND DIRECTING ACCESSORY DEVICE

CROSS-REFERENCE TO RELATED APPLICATION

This application is a continuation-in-part of U.S. application Ser. No. 15/438,664 filed Feb. 21, 2017 which claims the benefit of provisional application Ser. No. 62/297,821 filed Feb. 20, 2016.

STATEMENT REGARDING FEDERALLY SPONSORED RESEARCH OR DEVELOPMENT

N/A

FIELD OF THE INVENTION

This invention relates generally to an automobile wind directing device, and more particularly, to an automobile accessory device that attaches to an opening in a vehicle, such as a sunroof, and catches and directs wind into the cabin of the vehicle.

BACKGROUND OF THE INVENTION

Many people enjoy the feel of wind rushing over their face while in a moving automobile. People sitting in the back seat of a car with an open window or in a convertible are in the best position for experiencing the exhilaration of wind in their face. Automobiles with sunroofs are also popular, however, they do not facilitate wind blowing on or rushing onto occupants in the cabin of a vehicle. Rather, the wind merely blows over the roof and sunroof of the car with very little of that wind making it into the vehicle cabin. In fact, the driver and passenger in the front seat of an automobile with a sunroof feel virtually no wind from the sunroof. This is in part because many sunroofs are designed with a deflector at the front end of the sunroof for directing wind over the sunroof rather than into the cabin. Accordingly, while enjoying the openness of a sunroof, many are left desiring the effects of wind rushing onto them through the sunroof but with no practical solution for achieving this exhilaration. To experience gushing wind, one can place their hand out the sunroof but they can only do this temporarily because their arm tires, they become nervous about sustaining an injury or they must concentrate on driving. They can also hold a flat object out of the sunroof, but this solution rarely works effectively and creates a risk of dropping the object or causing injury. Accordingly, they are left wanting.

If there existed a device that could safely direct ambient wind through a sunroof or other vehicle opening into the cabin of the vehicle onto the driver or passengers, it would address these desires and be well received. However, there are no devices known that can redirect wind into the cabin of an automobile safely, effectively and efficiently. Therefore, there exists a need for an automobile accessory that can be safely and securely positioned in or near a sunroof for catching and directing wind into the cabin of an automobile while driving. It is, therefore, to the effective resolution of the aforementioned problems and shortcomings of the prior art that the present invention is directed. The instant invention addresses this unfulfilled need in the prior art by providing a wind deflecting or directing automobile accessory that directs wind into the cabin of an automobile while driving as contemplated by the instant invention disclosed herein.

SUMMARY OF THE INVENTION

In light of the foregoing, it is an object of the present invention to provide an automobile wind directing accessory device that is attachable to a sunroof opening or window of an automobile and has a panel or windshield, a track disposed on a rear surface of the windshield, at least one adjustable clamp wherein the clamp may be adjusted inward or outward inside the sunroof opening or window to dictate the point of wind flow into the cabin of a vehicle, a bracket projecting from a free end of the clamp for slidably engaging the track to adjustably join the clamp to the windshield. The support bracket may have a rotatable support arm that is connected to the clamp at one end and pivots on the support bracket at another end and may be fixed at a select angle to dictate the angle of wind deflection into the vehicle cabin.

It is another object of the instant invention, to provide an automobile wind directing accessory device that is attachable to a sunroof opening or window of an automobile and has a panel or windshield, support track with a plurality of rails secured to a rear surface of the windshield, a support bracket slidably connected to the support track and at least one adjustable clamp having a first leg pivotally and slidably connected to the support bracket to enable the clamp to be adjusted angularly and\inward or outward inside the sunroof opening or window to dictate the point where the windshield directs wind flow into the cabin of a vehicle and a second leg pivotally connected to the first leg by a spring device that maintains tips of the first leg and second leg in engagement with a vehicle in a normally closed position to secure the wind directing device in a vehicle opening and that are separated and opened when the first leg and second leg of the clamp are squeezed toward each other.

It is also an object of the instant invention to provide an automobile wind directing accessory device that is attachable to an opening of an automobile cabin and has a panel or windshield, support track with a plurality of rails secured to a rear surface of the windshield, and a support bracket with a ratchet that engages the rails at one end and a ball joint at another end pivotally joined to a clamp having a first leg connected to the ball joint of the support bracket and a second leg pivotally connected to the first leg by a spring device that maintains tips of the first leg and second leg in engagement with a vehicle window or sunroof opening in a normally closed position to secure the wind directing device in a vehicle opening and that are separated and opened when the first leg and second leg of the clamp are squeezed toward each other.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

With reference to the drawings in which like reference designators refer to like elements, FIGS. 1 to 11 depict the preferred and alternative embodiments of the instant invention which is generally referenced as an automobile wind directing device, wind directing device and, or by numeric character 10. In light of the foregoing, the automobile wind directing device 10 is a removable automobile accessory that attaches to an automobile roof in the opening of a sunroof or door window to catch and direct wind into the cabin of the automobile onto the driver and, or passenger while driving. The wind directing device 10 may be adjusted inward or outward within the opening or angularly and may vary in size to dictate the amount and width of wind caught and directed into the cabin and whether it will be directed to just the driver, passenger or everyone in the automobile.

With reference to FIGS. 1-7, the automobile wind directing device 10 includes a windshield 12, at least one clamp 24 having a first jaw 26, a second jaw 25, a support bracket 30, a ball joint assembly 60, a track 40 for slidably engaging the support bracket 30. The windshield 12 includes a rear surface 14 and a front surface 16. The clamp 24 has a first jaw 26 and a second jaw 25 pivotally connected to the first jaw 26 by a spring 44 and a support pin 27. The support clamp 24 projects outward from the rear surface 14 of the windshield 12 at adjustable angles. The support bracket 30 has a support base 32, a ratchet 34 depending from the base 32 and a latch 36 projecting upward from the base 32 for lifting and lowering the support bracket 30. The first jaw 26 includes a first leg 26a and a clamp paddle 26b at a free end of the first leg 26a. The first jaw 26 slidably engages and is supported by a ball joint assembly 30 which is in alignment with the first jaw leg 26a. The ball joint assembly 30 includes a ball joint 64 with an upper stem 23 projecting upward from the ball joint 64 toward and in alignment with the first jaw leg 26a and a lower stem 21 projecting downward from the ball joint 64 and secured to the support bracket base 32 and a securing flange 54 with a threaded port for receiving a threaded stem 52 from a depth adjustment knob 50. A ball joint casing 22 partially encloses the ball joint 64 and includes a threaded upper end for threadably mating with an internally threaded collar 62 to secure the ball joint 64 in the casing 22. The angle of the windshield 12 is adjusted and set by pivoting the first jaw leg 26a and stem 23 causing the ball joint 64 to pivot which is then secured in place by tightening the collar 62 when the desired angle of the windshield is achieved. The clamp first leg 26 slides up and down the securing flange 54 and is secured in a desired position by screwing the threaded knob stem 52 into the threaded aperture of the securing flange 54 by rotating the knob 50. Accordingly, the ball joint assembly 60 controls the angle of the windshield 12 while the first leg 26 and securing flange assembly 50-54 sets the depth of the windshield in the sunroof opening. The ball joint assembly 60 may include a locking knob assembly 68 for assisting in fixing the angle of the upper stem 23.

Figure 1:
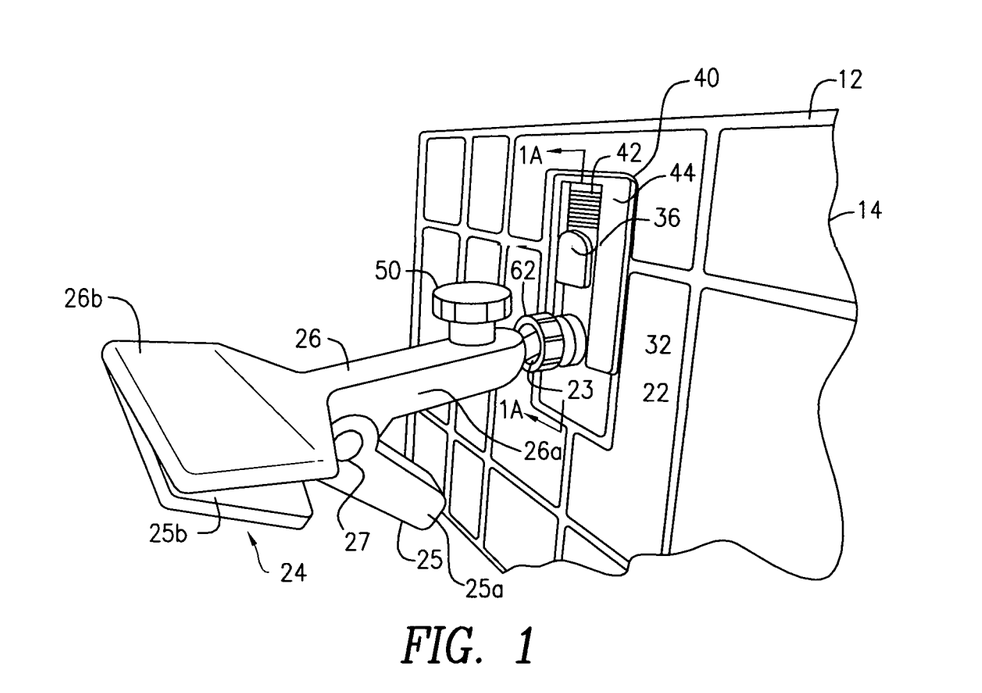
FIG. 1 is a perspective view of the automobile wind directing device having one clamp in accordance with the instant invention.
Figure 1A:
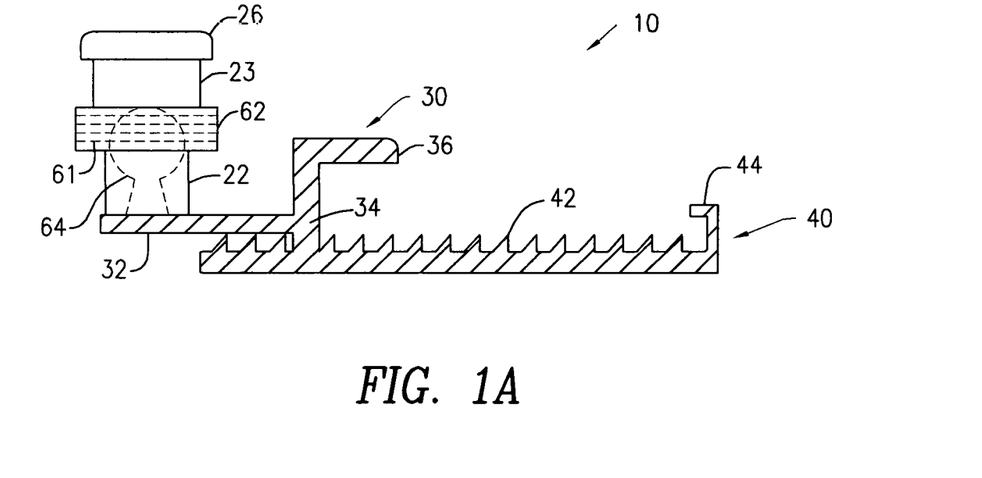
FIG. 1A is a cross-sectional view of the automobile wind directing device taken along cross-sectional lines 1A-1A of FIG. 1 illustrating the support bracket pivotally engaged to a first clamp leg by a ball joint at one end for adjusting the angle of the device and slidably engaged to a track having a plurality of rails for adjusting the linear position of the device in accordance with the instant invention.
Figure 2:
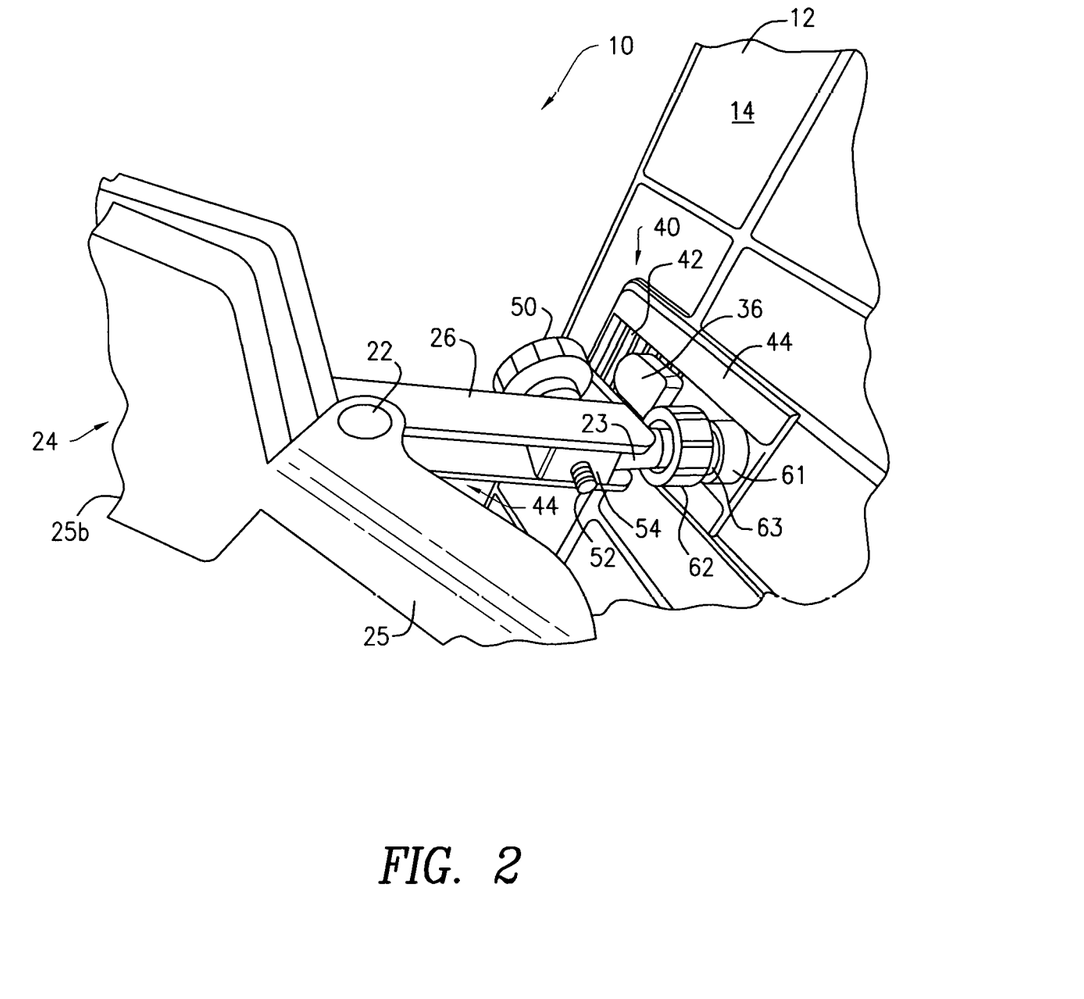
FIG. 2 is a perspective view of the automobile wind directing device having one clamp in accordance with the instant invention.
Figure 3:
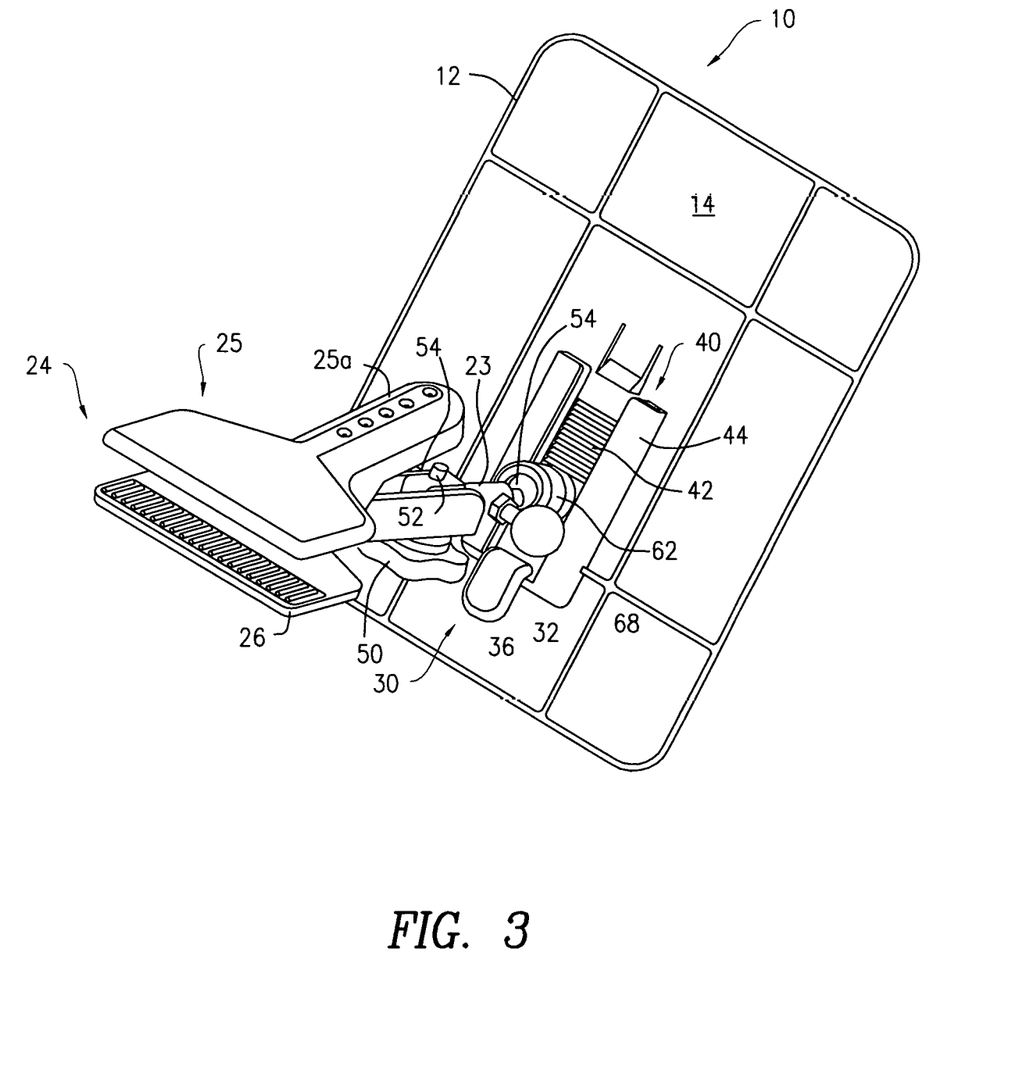
FIG. 3 is a perspective view of the automobile wind directing device having one clamp in accordance with a second alternative embodiment of the instant invention.
Figure 4:
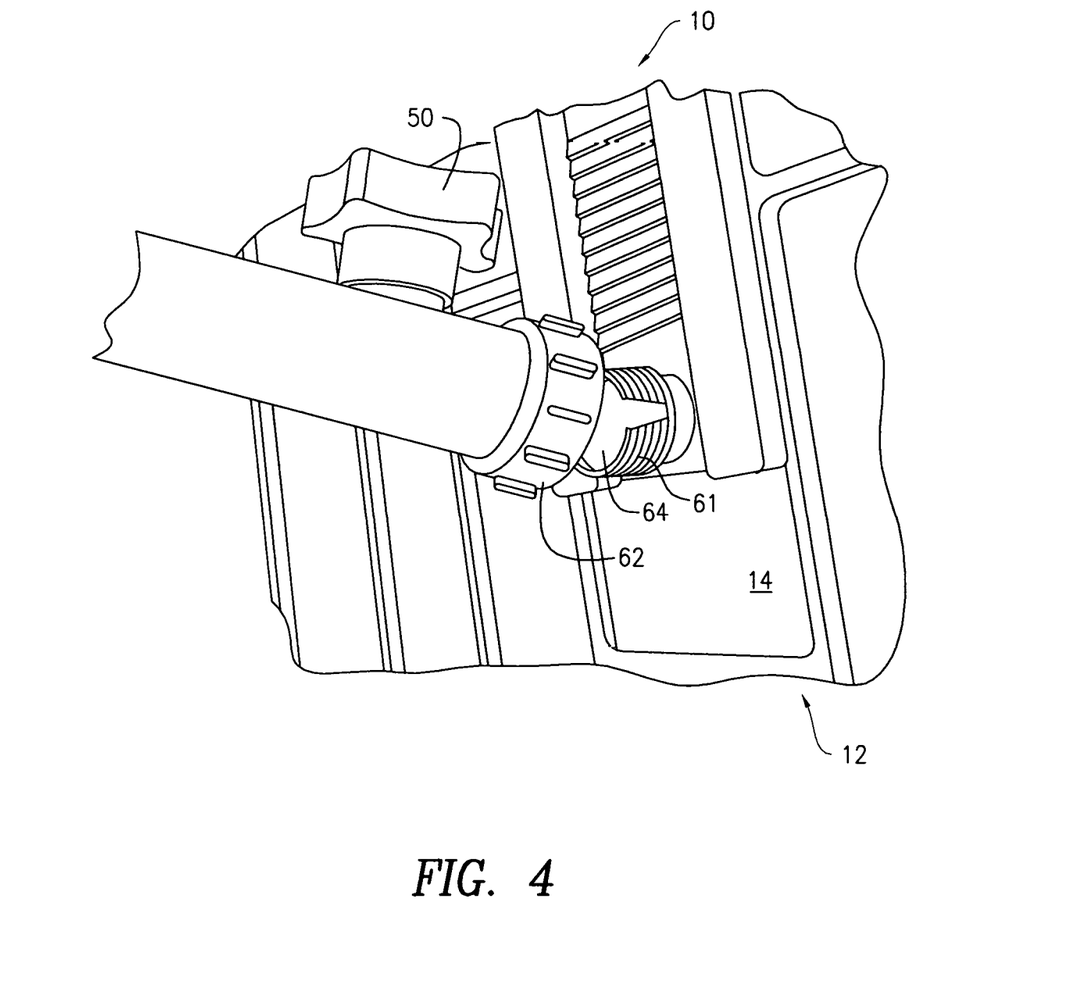
FIG. 4 is a close-up perspective view of the automobile wind directing device illustrating the ball joint and ball joint connection between a clamp leg and support bracket in accordance with the instant invention.
Figure 5:
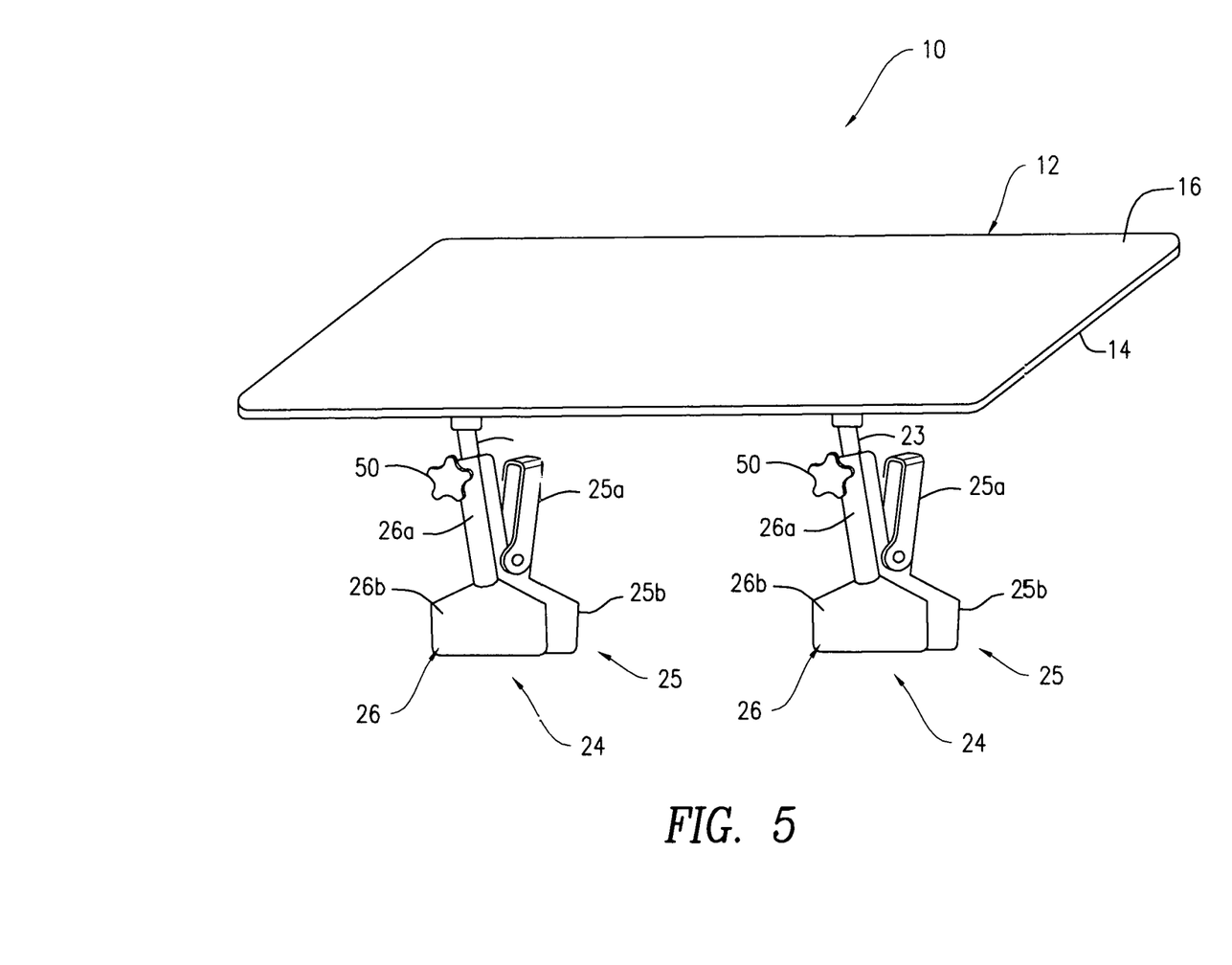
FIG. 5 is a front perspective view of the automobile wind directing device having two clamps in accordance with the instant invention.
Figure 6:
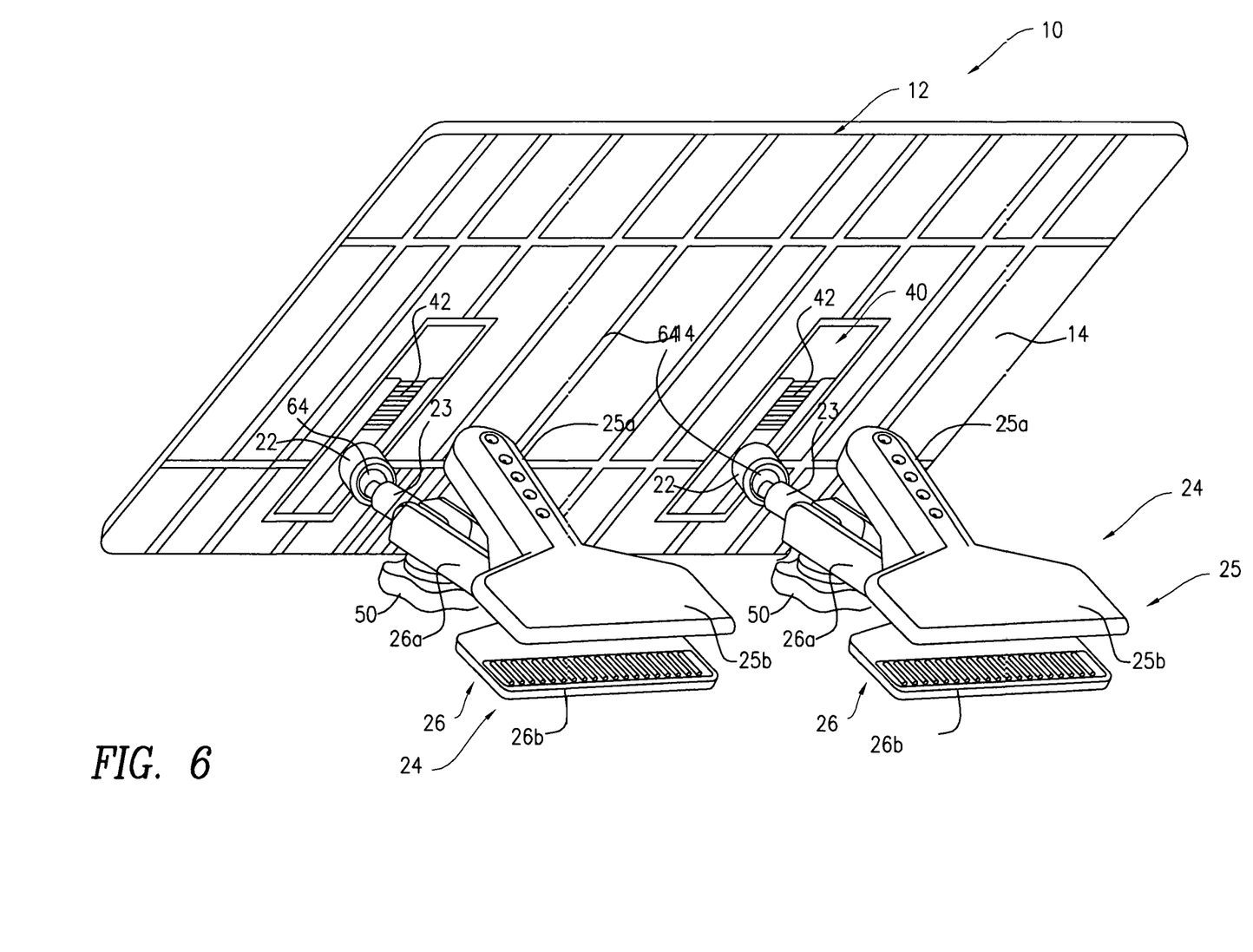
FIG. 6 is a rear perspective view of the automobile wind directing device adapted for two clamps illustrating the slidable engagement of a clamp support bracket with a support track in accordance with the preferred embodiment of the instant invention.
Figure 7:
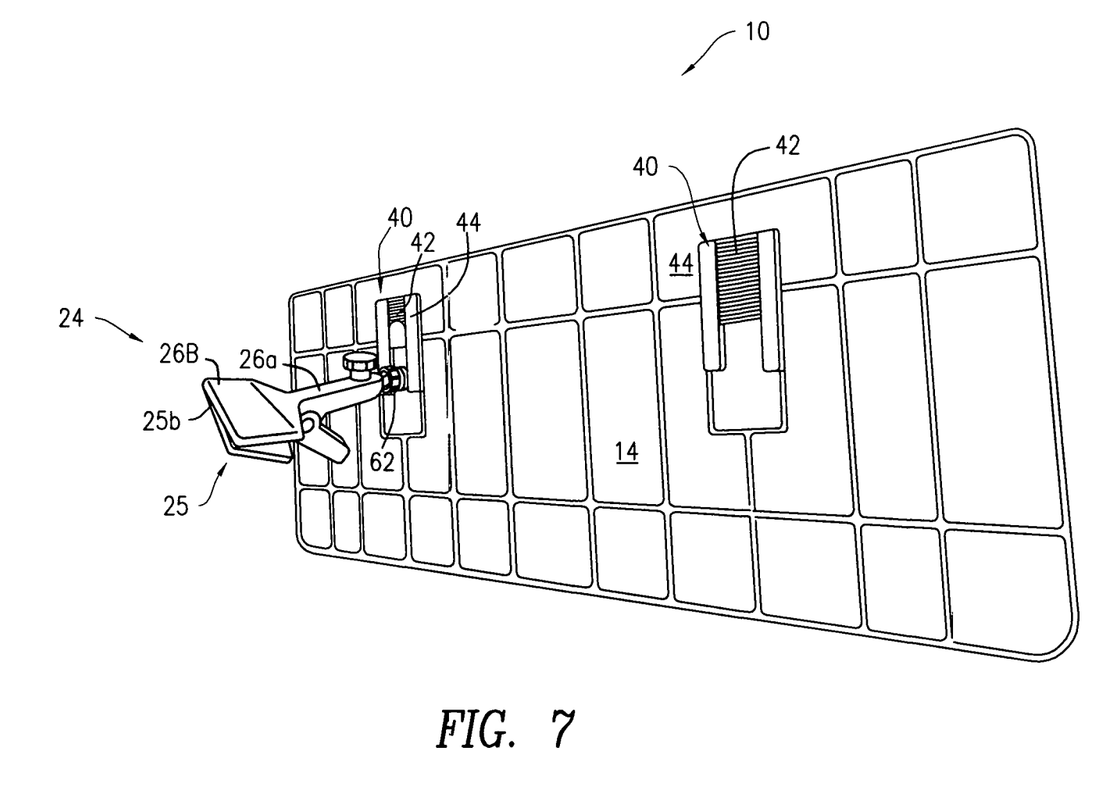
FIG. 7 is a rear perspective view of automobile wind directing device having two clamps in accordance with the instant invention.

Still referring to FIGS. 1-7, the support bracket assembly 30 mates with the track assembly 40 on the rear surface of the windshield 12 to adjust the elevation of the windshield the ball joint 64 has a lower stem 21 that is fixedly attached to the support bracket 30 by way of the support bracket base 32 at a lower end of the lower stem 21. The support bracket 30 has a ratchet 34 that depends from the bracket base 32 and a latch 36 that projects upward from the bracket base 32. The track 40 has side walls 44 with a lip 46 at its upper end for guiding and slidably securing the support bracket 30 as it slides along the track rails 42. The latch 36 is lifted to slides the support bracket ratchet 34 above and along the rails 42 and lowered to set the support bracket 30 at a desired position or elevation for the windshield 12. With reference to FIGS. 6 and 7, the wind directing device 10 may include a windshield with two tracks 40 and hence two clamps 24 with the above noted clamp, ball joint support bracket assemblies.

Figure 8:
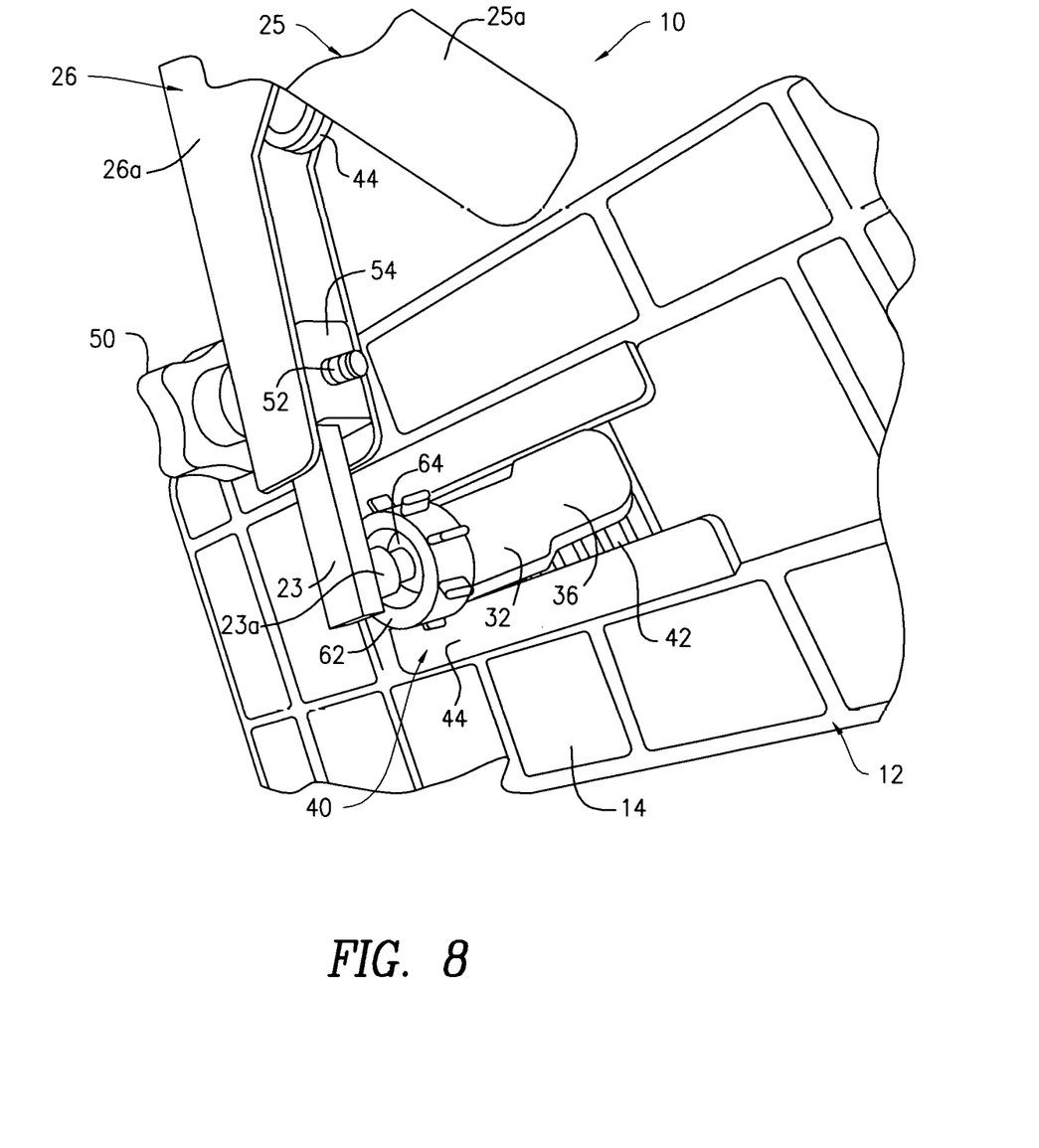
FIG. 8 is a rear perspective view of the automobile wind directing device adapted for attaching to a vehicle in a door window showing the clamp connected directly to the support bracket by a ball joint in accordance with the instant invention.
Figure 9:
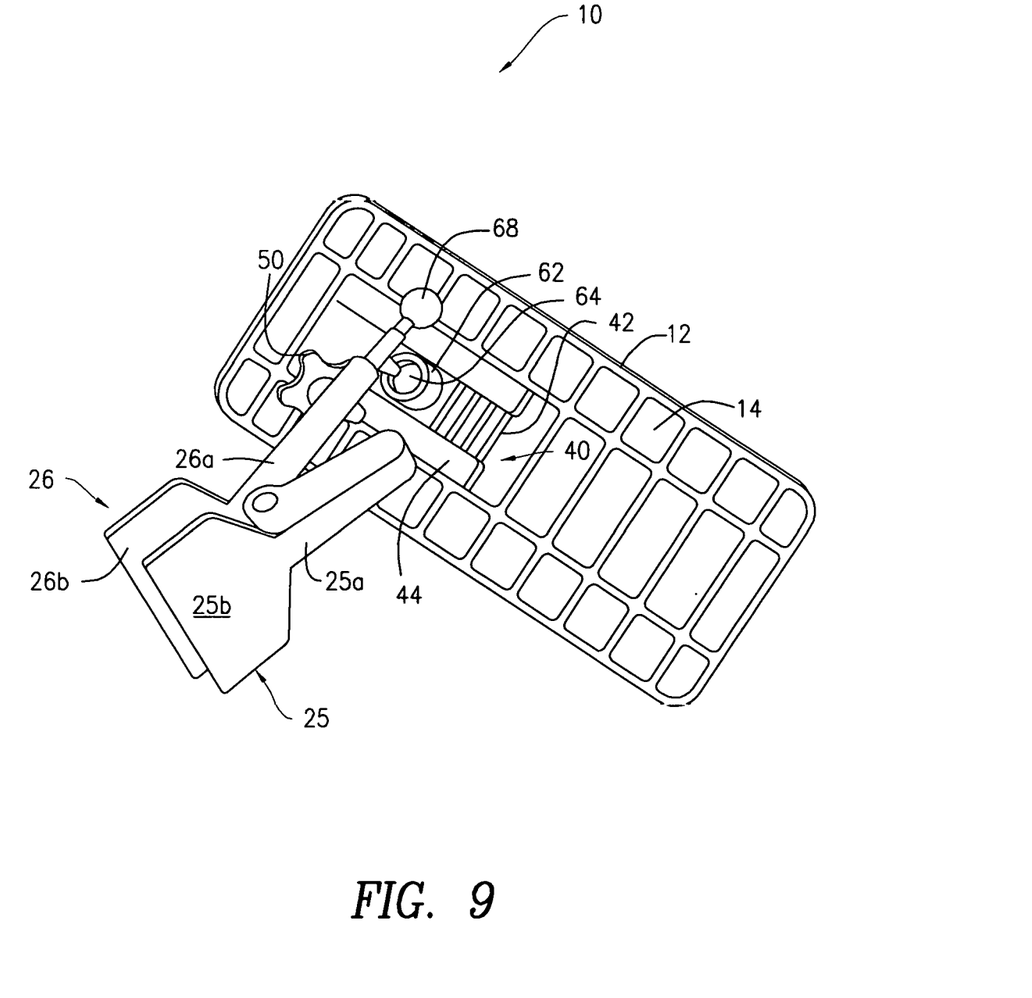
FIG. 9 is a rear perspective view of the automobile wind directing device adapted for attaching to a vehicle in a door window showing the clamp connected directly to the support bracket by a ball joint in accordance with the instant invention.
Figure 10:
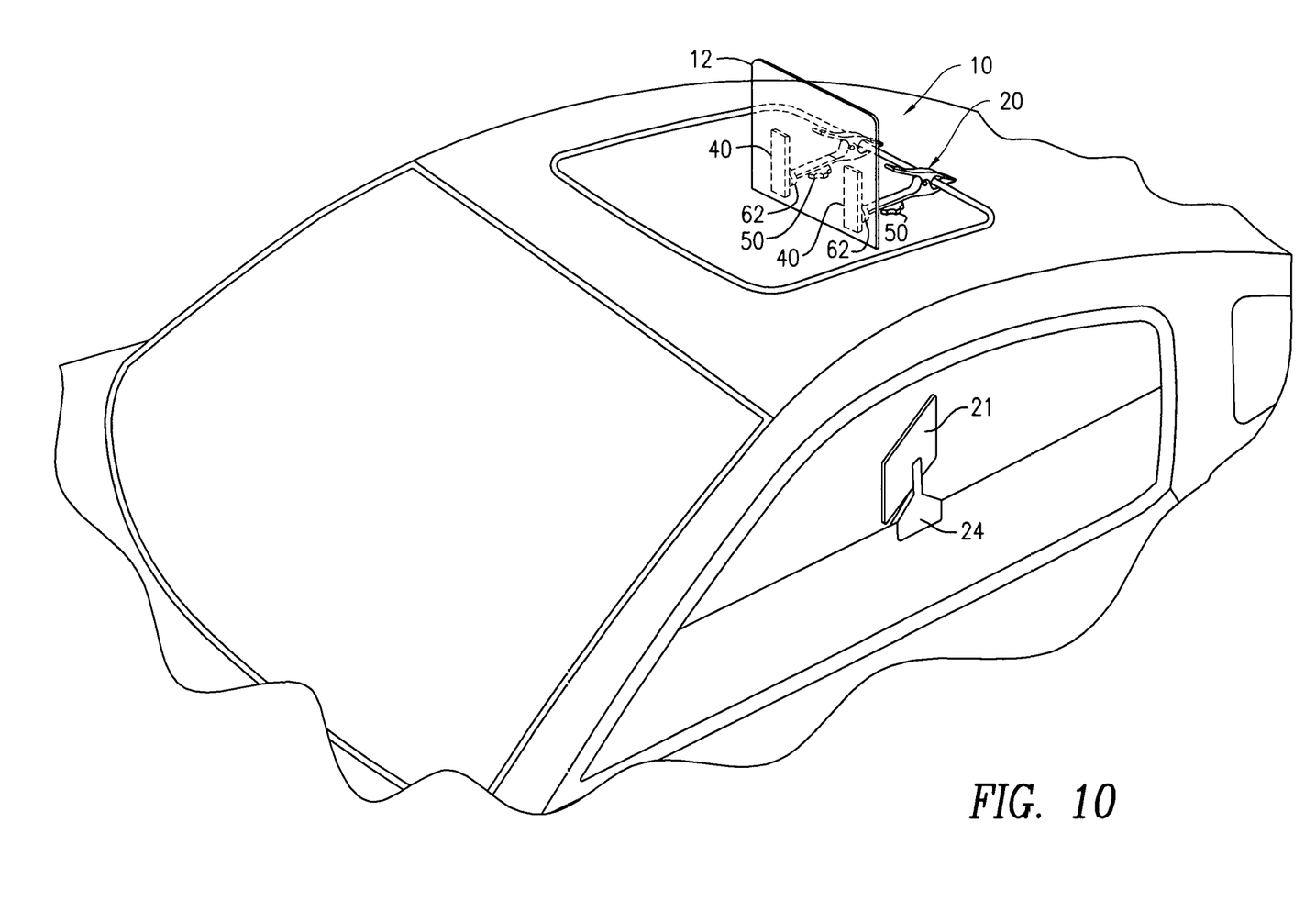
FIG. 10 is an elevational view showing one automobile wind directing device mounted to a vehicle roof in a sunroof opening and a second wind directing device mounted to a window glass pain in a door window in accordance with the instant invention.

Referring to FIGS. 8-10, the wind directing device 10 of the instant invention is adapted for attachment to a driver or passenger door window pane by securing the ball joint assembly 60 perpendicularly to the upper stem 23 such that the windshield 12 resides in a parallel plane with respect to clamp 24 first jaw leg 26a and second jaw leg 25a. Except for the orientation of the windshield 12 with respect to the clamp 24, the ball joint assembly 60, support bracket assembly 30, knob 50, securing flange 54, collar 62, encasement 22 and track assembly 40 are constructed and operate as aforementioned paragraphs 22-24, which are incorporated herein by reference. The wind directing device 10 for the sunroof opening and for the door window are installed as shown in FIG. 10.

Referring to FIGS. 1-9, the clamp 24 has an upper jaw 25 and a lower jaw 26 joined together by a spring loaded pin 27. The upper jaw 25 has a handle end 25a that extends from a clamp end 25b. The handle end 25a may include a grip or sleeve 29, such as rubber or plastic, to facilitate an improved grip with a hand by providing a slip resistant surface. The lower jaw 26 has a support end 26a and clamp end 26b. The support end 26a extends from the clamp end 26b and is secured to the lower flange 23. The clamp ends 25b and 26b may each include a sleeve or tip 28, such as rubber or plastic, to facilitate an improved grip with the automobile in a manner that prevents or reduces the likelihood of movement of the automobile wind directing device 10 on the automobile during use.

Still referring to FIGS. 1-10, the automobile wind directing device 10 may be mounted to an automobile I at the front end or back end of a sunroof opening. The wind directing device 10 is preferably mounted at the back end of the sunroof opening. The wind directing device 10 is mounted by squeezing the clamp 24 in the location that directs the wind into the cabin as desired. A vanity plate may be attached to the front surface 16 of the windshield 12. In this embodiment, the windshield 12 may have apertures or hardware for mating with fasteners used to secure the vanity plate to the front surface 16 of the windshield 12. The vanity plate may be used to display a team logo, name, message or other indicia. The windshield 12 may be adapted for securely mounting a portable camera for still photographs or video recordings.

In further reference to FIGS. 1-10, the automobile wind directing device 10 includes an adjustable support bracket assembly 30 and an adjustable clamp 24 to adjust the length, depth and, or angle at which the windshield 12 is displayed. The adjustable clamp 24 includes an upper jaw 25 pivotally connected to a lower jaw 26 by a spring 44, as shown in FIGS. 1-7. The upper and lower jaws 25, 26 each have a handle end 25a, 26a and a clamp end 25b, 26b, respectively. The spring 44 has an upper prong 46 and lower prong 48. Referring to FIG. 8, the upper prong 46 engages or is connected to the lower surface of the upper jaw handle 25a and the lower prong 48 engages or is connected to the upper surface of the lower jaw 26.

The automobile wind directing device 10 may include an attachable and removable plate, such as a license plate that displays a team or business name or logo or some other desired message. The windshield 12 may include a plurality of threaded or non-threaded apertures for receiving fasteners used in securing the plate 17 to the windshield, as shown in FIG. 5.

With reference to FIG. 10, the wind deflecting device 10 may be adapted for attaching to a vehicle inside or adjacent a door window opening. This embodiment of the instant invention 10 includes a windshield 12, a support bracket 22 connected or attached to the rear surface 14 of the windshield 12 and a clamp 24 attached to the support bracket 22. The lower jaw 26 of the clamp 24 is affixed to the support bracket 22. The upper jaw 24 is squeezed toward the lower jaw 26 to open the clamp 24 over a selected portion of the vehicle proximal the window opening and released when in position to secure the wind deflecting device 10 to the vehicle. Plastic or rubber tips 28 may be mounted or attached to the upper jaw 24 or lower jaw 26 handle ends or clamping ends 25b, 26b, as shown.

Figure 11:
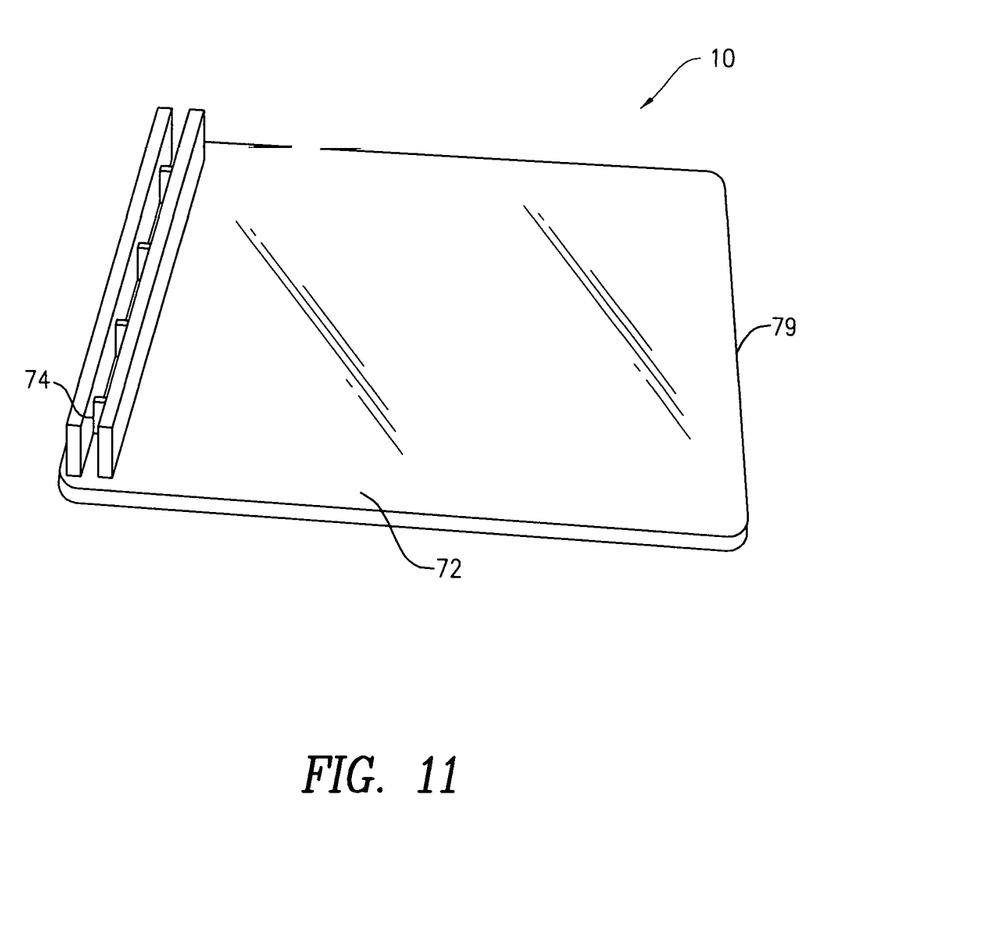
FIG. 11 is a perspective view of a wedge for additional securing of the wind deflecting device is shown in accordance with the instant invention.

With reference to FIG. 11, the wind deflecting device 10 may also include a wedge 70 having a flat surface 72 with a flange end 74 formed by one or two projecting walls wherein a gap may be formed between two walls. The wedge 70 is used on vehicles having a sunroof with a guide bar. The flat surface 72 is wedged into the roof slot where the sun roof slides to help secure the wind deflecting device 10 in a desired position.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An automobile wind directing device adapted for attachment to a vehicle over or inside a sunroof or window of a motor vehicle said wind directing device comprising:
   a windshield plate having a front surface and a rear surface;
   a support track disposed on said rear surface of said windshield plate, said support track having a plurality of rails and side guide walls with an upper lip;
   a support bracket that slidably engages said support track, said support bracket having a ball joint assembly at one end and a depending ratchet at another end for engaging said rails; and
   a clamp having a first jaw and a second jaw connected together by a spring, said first jaw having a first leg pivotally mounted to said ball joint assembly and said second jaw being pivotally mounted to said first leg by said spring so as to grip to the vehicle such that said windshield directs wind into the vehicle.

2. A wind directing device as recited in claim 1, further comprising:
   a threaded fastener rotatably mounted to said first leg.

3. A wind directing device as recited in claim 1, further comprising:
   a second support track disposed on said rear surface of said windshield plate, said second support track having a plurality of second rails and second side guide walls with a second upper lip;
   a second support bracket that slidably engages said second support track, said second support bracket having a second ball joint assembly at one end and a second depending ratchet at another end for engaging said second rails; and
   a second clamp having a second first jaw and a second second jaw connected together by a second spring, said second first jaw having a second first leg pivotally mounted to said second ball joint assembly and said second second jaw being pivotally mounted to said second first leg by said second spring so as to grip to the vehicle such that said windshield directs wind into the vehicle.

4. A wind directing device as recited in claim 1, further comprising:
   a wedge insertable in the sunroof opening of the vehicle so as to keep a wind deflector in the sunroof opening from elevating.

5. An automobile wind directing device adapted for attachment to a vehicle over or inside a sunroof or window of a motor vehicle, said wind directing device comprising:

a windshield plate having a front surface and a rear surface;

a support track disposed on said rear surface of said windshield plate, said support track having a plurality of rails and side guide walls with an upper lip;

a support bracket that slidably engages said support track;

said support bracket having a support base and a ratchet depending from said support base for engaging said rails;

a stem projecting from said support bracket; and a clamp having a first jaw and a second jaw connected together by a spring, said first jaw being mounted to said stem wherein said first jaw and said second jaw grip to the vehicle such that said windshield directs wind into the vehicle.

6. A wind directing device as recited in claim 5, wherein said support bracket further comprises:

a latch projecting from said support base for lifting and lowering said support bracket.

\* \* \* \* \*